United States Patent
Mori et al.

(10) Patent No.: US 6,808,836 B2
(45) Date of Patent: Oct. 26, 2004

(54) AIR SUPPLY SYSTEM FOR FUEL CELL

(75) Inventors: Hidefumi Mori, Kariya (JP); Ryuta Kawaguchi, Kariya (JP); Masato Sowa, Kariya (JP); Takashi Ban, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 556 days.

(21) Appl. No.: 09/738,611

(22) Filed: Dec. 15, 2000

(65) Prior Publication Data

US 2001/0041280 A1 Nov. 15, 2001

(30) Foreign Application Priority Data

Dec. 17, 1999 (JP) .......................................... 11-358721

(51) Int. Cl.[7] .......................... H01M 8/04; H01M 8/12; H01M 2/00; H01M 2/02; F01C 21/04
(52) U.S. Cl. .............................. 429/34; 429/26; 418/83; 418/84
(58) Field of Search ....................... 429/34, 26; 418/83, 418/84

(56) References Cited

U.S. PATENT DOCUMENTS

| | | | | |
|---|---|---|---|---|
| 3,850,554 A | * | 11/1974 | Zimmem | ................... 418/84 |
| 4,517,259 A | * | 5/1985 | Lance | ..................... 429/26 |
| 5,247,795 A | | 9/1993 | McCullough | ............... 60/605.1 |
| 5,434,016 A | * | 7/1995 | Benz et al. | ................... 429/13 |
| 5,958,614 A | * | 9/1999 | Takei et al. | .................. 429/26 |
| 6,124,052 A | * | 9/2000 | Katoh et al. | .................. 429/33 |

FOREIGN PATENT DOCUMENTS

| | | | |
|---|---|---|---|
| DE | 199 55 291 A1 | 5/2000 | ............ H01M/8/04 |
| JP | 7-14599 | 1/1995 | |
| JP | 8-68386 | 3/1996 | |
| JP | 2000-100459 | 4/2000 | |
| JP | 2000-110727 | 4/2000 | |

* cited by examiner

Primary Examiner—Carol Chaney
Assistant Examiner—Julian Mercado
(74) Attorney, Agent, or Firm—Morgan & Finnegan, LLP

(57) ABSTRACT

An air supply system for a fuel cell is disclosed, in which a compression chamber (17) of an air supply mechanism (GS) is adapted to supply air to a fuel cell (FC). A liquefaction unit (14) acting as a water supply mechanism (WS) supplies water to the air supply mechanism (GS) to seal and cool the compression chamber (17). The liquefaction chamber (14) separates water from the exhaust gas discharged from the fuel cell (FC) and supplies the water to the air supply mechanism (GS). The air supply mechanism (GS) and the liquefaction unit (14) are integrated with each other.

14 Claims, 15 Drawing Sheets

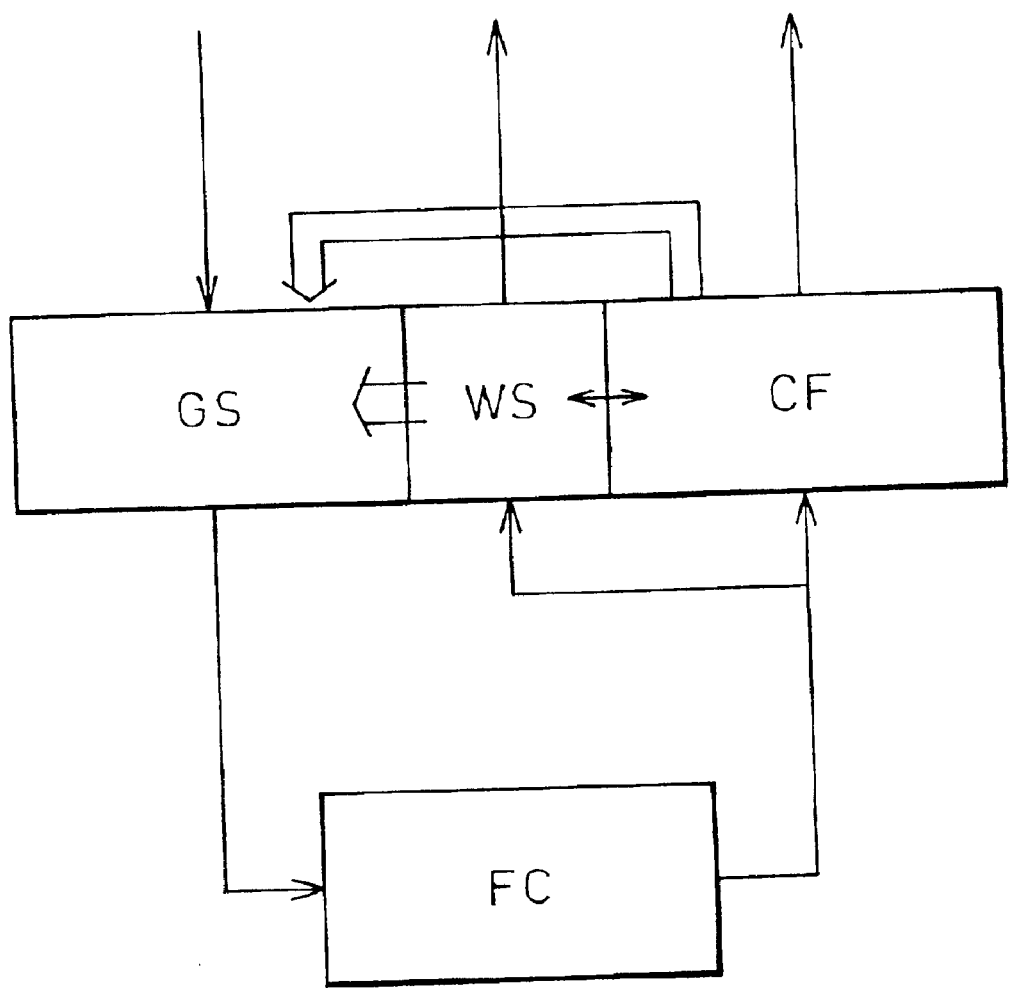

AIR SUPPLY SYSTEM FOR FUEL CELL

BACKGROUND OF THE INVENTION

1. Field of the Invention

The present invention relates to an air supply system for a fuel cell used in a fuel cell system.

2. Description of the Related Art

A fuel cell system used for an automotive vehicle includes a fuel cell and an air supply system for a fuel cell connected to the fuel cell (Japanese Unexamined Patent Publication No. 7-14599).

Specifically, a fuel supply pipe and an air supply pipe for supplying the fuel and the air, respectively, are connected upstream of the fuel cell. The air supply pipe is opened to the atmosphere through a compressor driven by a motor, so that the air constituting an oxygen-containing gas in the atmosphere is compressed to a predetermined pressure in the compression chamber of the compressor and supplied to the fuel cell. This compressor makes up an air supply mechanism as a part of the air supply system for the fuel cell and the compression chamber of the compressor constitutes an air supply chamber.

An air discharge pipe for discharging into the atmosphere the exhaust gas constituting the air from which oxygen is consumed in the fuel cell is connected downstream of the fuel cell. The air discharge pipe is opened to the atmosphere through a regenerator configured integrally with the compressor and, therefore, the exhaust gas is expanded in the regeneration chamber thereby to drive the regenerator and thus assist the compressor. The exhaust gas in the air discharge pipe is produced by reaction in the fuel cell, and therefore contains water vapor generated in the fuel cell as well as water vapor from the atmosphere. For this reason, the air supply system for the fuel cell includes a liquid separator in addition to the compressor and the regenerator described above. The liquid separator is connected with an air discharge pipe, and separates the water vapor as water from the exhaust gas passing through the air discharge pipe. The water thus produced is stored in a storage vessel and then injected into the compression chamber of the compressor by a pump to seal and cool the compression chamber. The liquid separator, the storage vessel and the pump make up a water supply mechanism as the remaining part of the air supply system for the fuel cell. In this way, the air supply system for the fuel cell improves the compression efficiency of the compressor and hence the power generation efficiency of the fuel cell.

In the conventional air supply system for a fuel cell described above, however, the compressor and the regenerator, though integrated with each other, are separated from the liquid separator, the storage vessel and the pump. Therefore, the structure is not sufficiently simplified, thereby increasing the production cost of the air supply system for the fuel cell. Especially, the need for the liquid separator tends to complicate the system. This air supply system for the fuel cell, if used for an automotive vehicle, is unavoidably disadvantageous from the viewpoint of mountability due to its large size.

SUMMARY OF THE INVENTION

The present invention has been developed to solve this problem and the object thereof is to provide a sufficiently simplified air supply system for a fuel cell which is low in production cost and which is capable of maintaining the power generation efficiency of the fuel cell.

According to one aspect of the present invention, there is provided an air supply system for a fuel cell comprising an air supply mechanism including an air supply chamber capable of supplying an oxygen-containing gas to a fuel cell and a water supply mechanism for supplying water to the air supply mechanism to close and cool the air supply chamber, wherein the water supply mechanism supplies water to the air supply mechanism by separating it from the exhaust gas discharged from the fuel cell, and the air supply mechanism is integrated with the water supply mechanism.

In the air supply system for a fuel cell according to this aspect of the invention, the water supply mechanism separates water from the exhaust gas discharged from the fuel cell, and the water is supplied to the air supply mechanism. Specifically, the water supply mechanism functions as a liquid separator, a storage vessel and a pump in the prior art. Since the water supply mechanism is integrated with the air supply mechanism, the structure is sufficiently simplified and therefore the production cost of the air supply system for the fuel cell can be reduced. Especially the air supply system for the fuel cell, if used with an automotive vehicle, can be advantageously mounted on the vehicle due to its simplicity.

In this way, with the air supply system for the fuel cell according to the invention, the power generation efficiency of the fuel cell can be maintained while sufficiently simplifying the structure, and reducing the production cost, of the fuel cell.

According to another aspect of the invention, there is provided an air supply system for a fuel cell wherein at least the drive source such as a motor for driving the air supply mechanism is also integrated with the air supply mechanism and the water supply mechanism. By doing so, the structure is further simplified for a further reduced production cost. This simplified structure also improves the mountability of the air supply system for the fuel cell, if used in an automotive vehicle.

The air supply mechanism includes an air supply chamber capable of supplying an oxygen-containing gas to the fuel cell. The air supply mechanism can be of any of various types including a scroll, a vane, a screw, a root and a piston type. The scroll-type air supply mechanism, the vane-type air supply mechanism and the piston-type air supply mechanism, in which the volume of the closed space is reduced, implement the air supply chamber as a compression chamber. The screw-type air supply mechanism and the root-type air supply mechanism, on the other hand, do not reduce the volume of the closed space but supply the gas under pressure and, therefore, implement the air supply chamber as a pressurized supply chamber.

The air supply mechanism is desirably capable of changing the amount of the oxygen-containing gas per unit power. By doing so, the amount of the oxygen-containing gas supplied to the fuel cell can be changed as required, and wasteful power consumption can be avoided for a further improved mechanical efficiency.

The water supply mechanism can include a liquefying unit for liquefying, into water, the water vapor contained in the exhaust gas discharged from the fuel cell. The liquefying unit can be of a centrifugal separation type in which a turbulent flow of the exhaust gas is generated by centrifugal force and collides with the peripheral surface for liquefying the water vapor into water.

On the other hand, the water supply mechanism can include a regeneration mechanism unit for assisting the air supply mechanism by expanding the exhaust gas. The regeneration mechanism includes a regeneration chamber capable of supplying the water generated by expansion of the exhaust gas to the air supply mechanism. Specifically, the exhaust gas is reduced in temperature by expansion, and the water vapor contained in it is liquefied into water. Thus, the regeneration mechanism can function as a water supply mechanism. By doing so, water is supplied from the regeneration chamber of the regeneration mechanism to the air supply mechanism to close and cool the air supply chamber. Therefore, the regeneration mechanism is easily integrated with the air supply mechanism, and a need for a liquid separator is eliminated. In this way, the system is further simplified and the production cost of the air supply system for a fuel cell can be further reduced. In this case, the power generated by the regeneration mechanism adds to the power for activating the air supply mechanism. Specifically, the regeneration mechanism recovers the residual energy from the exhaust gas of the fuel cell and adds it to the power of the air supply mechanism. As a result, wasteful power consumption is avoided for a further improved mechanical efficiency.

The water supply mechanism, desirably, can change the amount of water supplied. By doing so, the amount of water supplied to the air supply mechanism can be changed as required, and therefore the optimum power generation efficiency can be realized.

The air supply mechanism and the regeneration mechanism can be configured to operate on different drive shafts and can be connected to each other through a power transmission mechanism. As an alternative, the air supply mechanism and the regeneration mechanism can be configured to operate on the same drive shaft. The drive shaft is desirably shared by the motor or the like drive source. By doing so, the simplified structure can further reduce the production cost.

The drive source can be an internal combustion engine instead of a motor. In the case where both the motor and the internal combustion engine are used as drive sources, an electromagnetic clutch is desirably arranged between the internal combustion engine and at least the drive shaft of the air supply mechanism. In the case where this air supply system for the fuel cell is mounted on a hybrid car or the like, the mode for driving at least the air supply mechanism by the motor and the mode for driving at least the air supply mechanism by the internal combustion engine can be switched other easily.

Also, the air supply mechanism and the regeneration mechanism are desirably configured to operate on the same drive shaft. The resulting simplified structure can further reduce the production cost.

At least one of the air supply mechanism and the regeneration mechanism is desirably of a scroll type. In that case, the effects described above can be exhibited while at the same time making it possible to achieve a quiet and lightweight air supply system for the fuel cell.

According to yet another aspect of the invention, there is provided an air supply system for a fuel cell comprising an air supply mechanism and a regeneration mechanism of scroll type, wherein the air supply mechanism preferably includes a housing, one surface of the side plate orbiting about a drive shaft and a first spiral member protruded from the same one surface, and the regeneration mechanism preferably includes a housing, the other surface of the same side plate and a second spiral member protruded from the same other surface. In this air supply system for the fuel cell, the side plate from which the first and second spiral members protrude can be shared by the air supply mechanism and the regeneration mechanism of scroll type. As a result, the structure can be considerably simplified and the production cost can be reduced. Also, the total axial length including the drive source such as the motor can be reduced, thereby attaining a superior mountability on a automotive vehicle, for example.

Further, at least one of the air supply mechanism and the regeneration mechanism is desirably of vane type. In that case, the air supply system for the fuel cell, though somewhat less quiet, can achieve an operation and effects similar to those of scroll type.

According to a further aspect of the invention, there is provided an air supply system for a fuel cell comprising an air supply mechanism and a regeneration mechanism of vane type, wherein the air supply mechanism includes a housing, a first rotor rotated by a drive shaft and a first vane adapted to protrude in a radial direction from the first rotor, and the regeneration mechanism includes a housing, a second rotor rotating on the same axis as the first rotor and a second vane adapted to protrude in a radial direction from the second rotor. In this air supply system for the fuel cell, the first rotor and the second rotor have the same structure, and therefore the production cost is reduced.

The present invention will be more fully understood with reference to the accompanying drawings and the preferred embodiments of the invention.

BRIEF DESCRIPTION OF THE DRAWINGS

FIG. 15 is a diagram schematically showing the structure of an air supply system for a fuel cell according to the sixth and seventh embodiments of the invention.

DESCRIPTION OF THE PREFERRED EMBODIMENTS

The first to seventh embodiments of the present invention will be described below with reference to the accompanying drawings.

Embodiment 1

Figure 1:
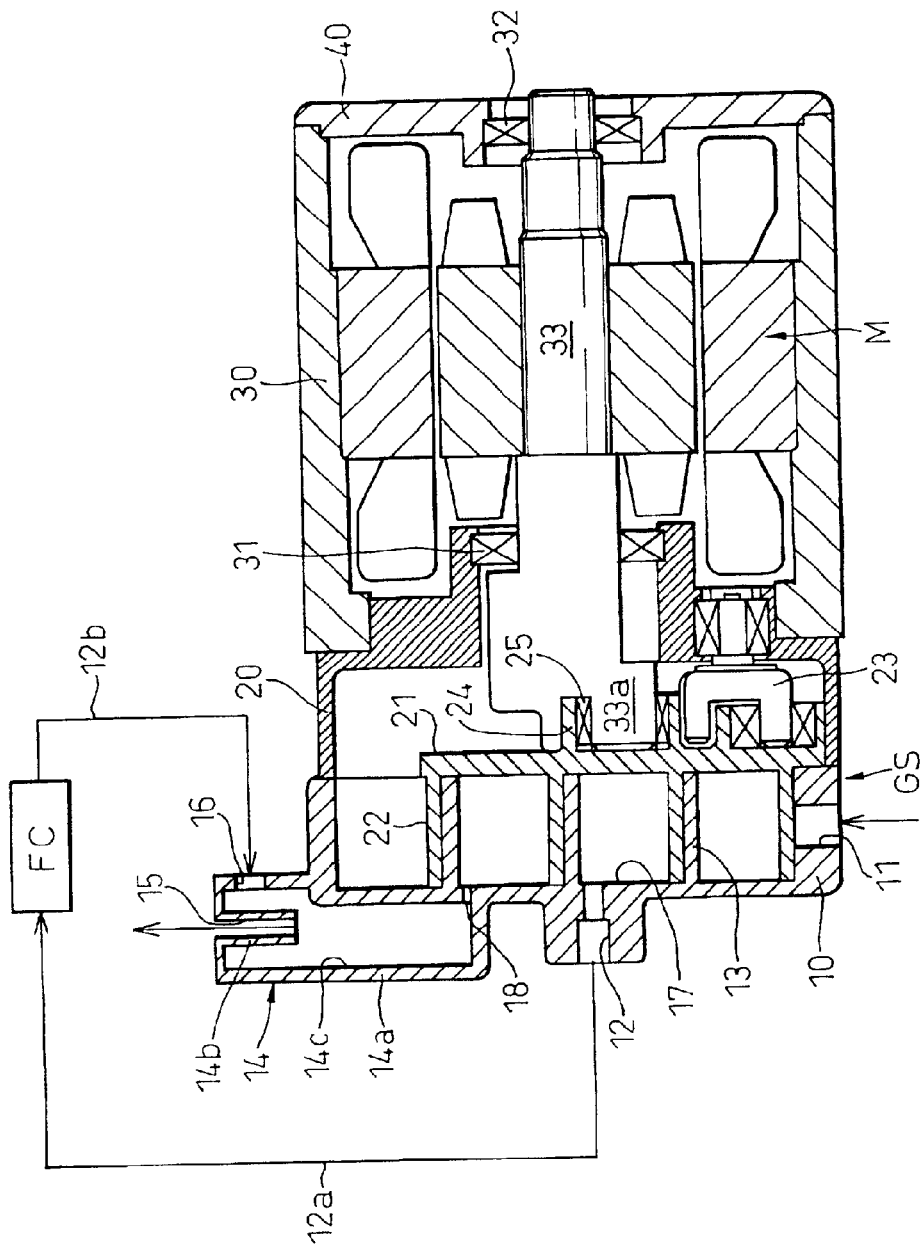
FIG. 1 is a longitudinal sectional view of an air supply system for a fuel cell according to a first embodiment of the invention.

In the air supply system for a fuel cell according to a first embodiment of the invention, as shown in FIG. 1, a center housing 20 is coupled to the rear end of a front housing 10, and a motor housing 30 is coupled to the rear end of the center housing 20. A rear housing 40 is coupled to the rear end of the motor housing 30. The front housing 10, the center housing 20, the motor housing 30 and the rear housing 40 make up a housing assembly.

An air suction hole 11 is opened to the atmosphere on the radial side of the front housing 10, and an air discharge hole 12 is formed at the axial front end of the central portion of the front housing 10. The air discharge hole 12 is connected to an air supply pipe 12a communicating with the oxygen-containing gas supply side of the fuel cell FC. A fixed spiral member 13 is protruded rearward in axial direction in the front housing 10.

A liquefaction unit 14 of a centrifugal separation type constituting a water supply mechanism WS is arranged at the front outer periphery of the front housing 10. The liquefaction unit 14 includes a vertically extending outer cylinder portion 14a with a bottom and forming an internal liquefaction chamber 14c, and an inner cylinder portion 14b protruded downward from the upper end of the outer cylinder portion 14a along the same axis as the latter. The outer cylinder portion 14a is formed therethrough with an air introduction hole 16 at a position facing the outer peripheral surface of the inner cylinder portion 14b. The air introduction hole 16 is connected with an air discharge pipe 12b communicating with the gas discharge side of the fuel cell FC. The interior of the inner cylinder portion 14b is formed with an air discharge hole 15 communicating with the atmosphere.

A side plate 21 extending in radial direction is interposed between the front housing 10 and the center housing 20. A movable spiral member 22 is protruded forward in axial direction from the side plate 21. The movable spiral member 22 of the side plate 21 is in mesh with a fixed spiral member 13 of the front housing 10.

In this way, a compression chamber is formed as a feeder chamber closed by the front housing 10 and the side plate 21. These members make up an air supply mechanism GS of a scroll type. The air suction hole 11 communicates with the compression chamber 17 not yet closed, while the air discharge hole 12 communicates with the closed compression chamber 17 after the final compression operation. A water supply hole 18 communicating with the closed compression chamber 17 is formed through the bottom portion of the liquefaction chamber 14c.

An antirotation mechanism 23 is arranged between the front housing 10, the center housing 20 and the side plate 21. A boss 24 protruding axially rearward is formed on the central portion of the side plate 21.

A drive shaft 33 is rotatably supported through bearing units 31, 32 on the center housing 20 and the rear housing 40, while a motor M constituting a drive source including the drive shaft 33 is arranged in the motor housing 30. A crank pin 33a is protruded eccentrically from the forward end of the drive shaft 33, and rotatably inserted into the boss 24 of the side plate 21 through a bearing unit 25.

In this way, the air supply mechanism GS and the liquefaction unit 14 are integrated with each other and with the motor M.

In the air supply system for a fuel cell configured as described above, when the drive shaft 33 is driven by the motor M the side plate orbits with the rotation thereof restricted by the antirotation mechanism 23. As a result, the volume of the compression chamber 17 of the air supply mechanism GS is gradually reduced, so that the air constituting the oxygen-containing gas in the atmosphere is introduced into the compression chamber 17 from the air suction hole 11, and after being compressed to high pressure in the compression chamber 17, supplied to the fuel cell FC through the air supply pipe 12a from the air discharge hole 12. In the fuel cell FC, the oxygen in the air is consumed and the air remaining as an exhaust gas is supplied from the air discharge pipe 12b through the air introduction hole 16 to the liquefaction unit 14.

The air that has passed the fuel cell FC has already reacted, and therefore contains the water vapor generated in the fuel cell FC as well as the water vapor from the atmosphere. As a result, in the liquefaction unit 14, the air discharged from the fuel cell generates a turbulent flow around the inner cylinder portion 14b by centrifugal force, and this turbulent flow collides with the inner peripheral surface of the liquefaction chamber 14c thereby to liquefy the water vapor, contained in the air, into water. The remaining air is released into the atmosphere from the air discharge hole 15.

In this way, water stays in the liquefaction chamber 14c, and this water is supplied to the closed compression chamber 17 through the water supply hole 18. As a result, the air supply system for the fuel cell according to the first embodiment functions as the liquid separator, the storage vessel and the pump in the prior art. This liquefaction unit 14 has a sufficiently simplified structure, included in the air supply mechanism GS integrated with the motor M, and is low in production cost. Therefore, it is suitably used in an automotive vehicle from the viewpoint of mountability.

With the air supply system for the fuel cell according to the first embodiment, it is seen that a sufficiently simplified structure can reduce the production cost while maintaining the power generating efficiency of the fuel cell FC.

Embodiment 2

Figure 2:
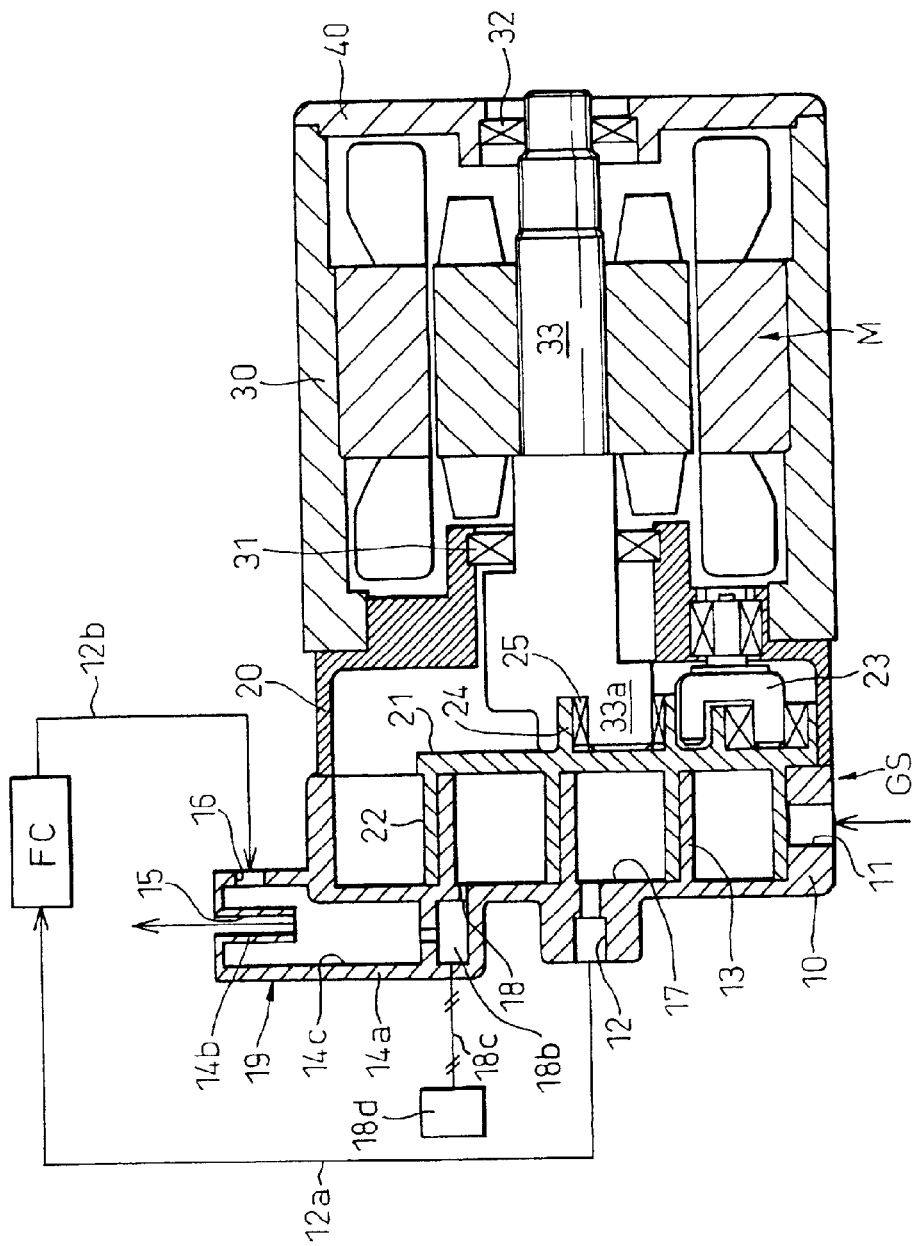
FIG. 2 is a longitudinal sectional view of an air supply system for a fuel cell according to a second embodiment of the invention.

The air supply system for a fuel cell according to a second embodiment comprises a liquefaction unit 19 shown in FIG. 2. The liquefaction unit 19 includes a valve 18b formed in the bottom portion of the outer cylinder portion 14a and adapted to open/close the water supply hole 18. The valve 18b is connected to a controller 18d by a lead wire 18c, and the water supply hole 18 can be opened or closed by the valve 18b in response to a predetermined signal. The remaining parts of the configuration are the same as the corresponding ones of the first embodiment.

In the air supply system for a fuel cell according to the first embodiment, the amount of water supplied in the liquefaction unit 14 changes with the weight based on the amount stored in the outer cylinder portion 14a, the inner diameter of the water supply hole 18 and the pressure in the compression chamber 17. In the air supply system for the fuel cell according to the second embodiment, in contrast, the amount of water supplied to the compression chamber 17 can be adjusted by the controller 18*d*. In the air supply system for a fuel cell according to the second embodiment, therefore, the compression chamber 17 can be steadily sealed and cooled, thereby making it possible to stabilize the power generation efficiency of the fuel cell FC.

The functions and effects of the other parts are the same as the corresponding ones of the first embodiment.

Embodiment 3

Figure 3:
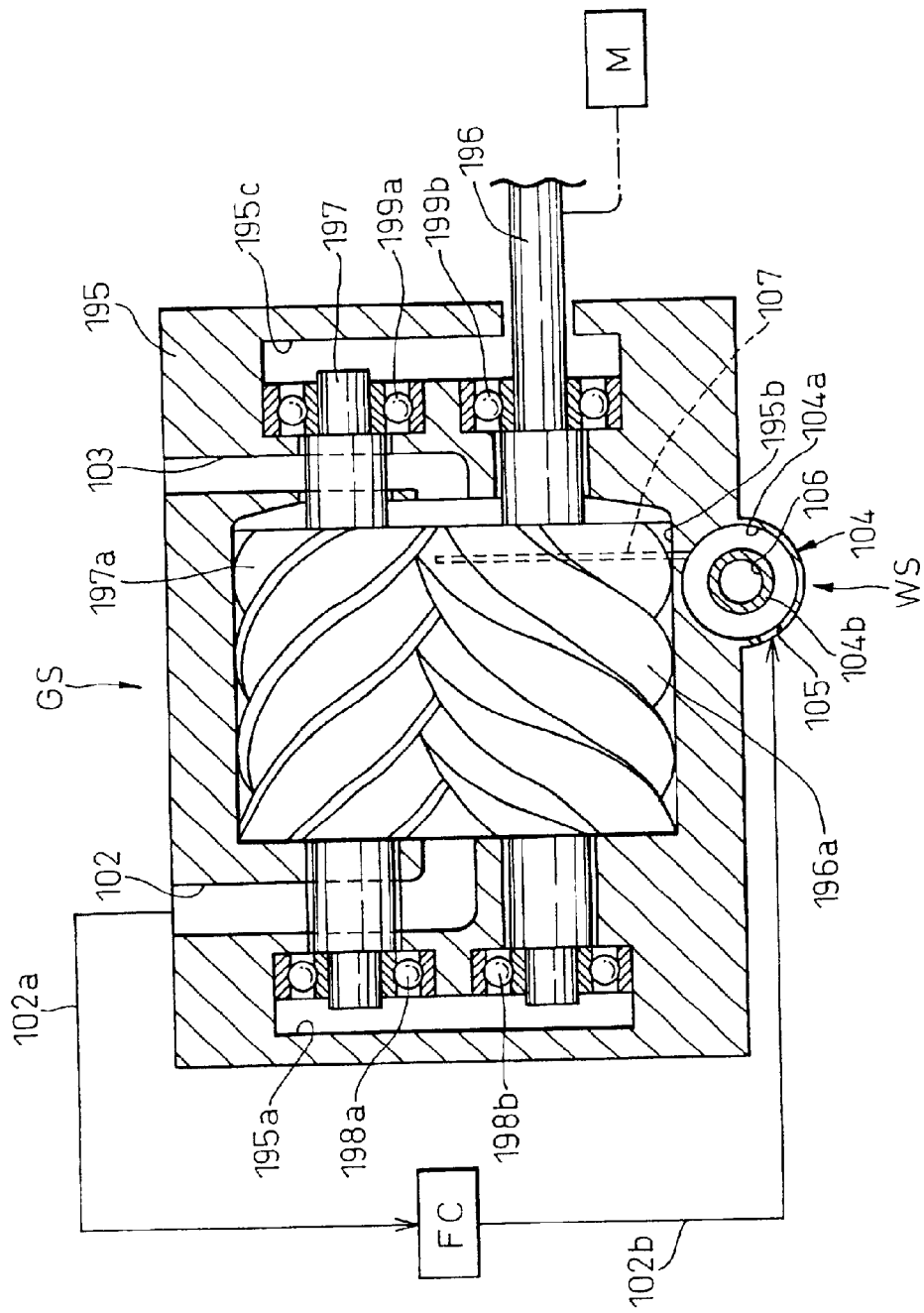
FIG. 3 is a longitudinal sectional view of an air supply system for a fuel cell according to a third embodiment of the invention.
Figure 4:
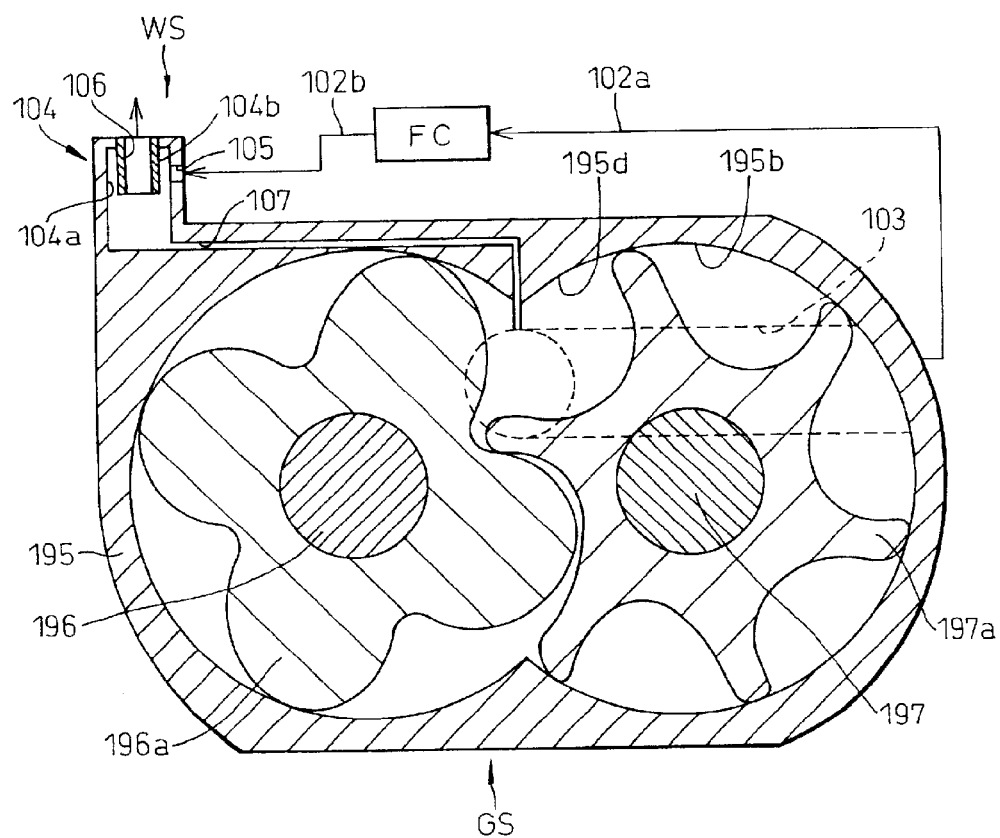
FIG. 4 is a cross sectional view of an air supply system for a fuel cell according to the third embodiment of the invention.

The air supply system for a fuel cell according to a third embodiment of the invention comprises, as shown in FIG. 3, a housing 195 including therein a first bearing unit chamber 195*a*, a screw chamber 195*b* and a second bearing unit chamber 195*c* arranged in that order from the front side of the housing 195. The first bearing unit chamber 195*a*, the screw chamber 195*b* and the second bearing unit chamber 195*c* have a drive shaft 196 and a driven shaft 197 extending in parallel to each other. The drive shaft 196 and the driven shaft 197 are rotatably supported by the first bearing units 198*a*, 198*b* and the second bearing units 199*a*, 199*b* in the first bearing unit chamber 195*a* and the second bearing unit chamber 195*c*, respectively. A drive screw 196*a* having the section thereof shown in FIG. 4 is fixed on the drive shaft 196, and a driven screw 197*a* having the section thereof shown in FIG. 4 is fixed on the driven shaft 197. The drive screw 196*a* and the driven screw 197*a* are in mesh with each other. A pressured supply chamber 195*d* constituting an air supply chamber is formed of the screw chamber 195*b* of the housing 195, the drive screw 196*a* and the driven screw 197*a*. As shown in FIG. 3, the drive shaft 196 is arranged through the rear wall of the housing 195 and connected to the motor M constituting a drive source through a power transmission mechanism not shown. Thus, the air supply mechanism GS of a screw type is configured.

An air suction hole 103 open to the atmosphere is formed between the screw chamber 195*b* and the second bearing unit chamber 195*c*. This air suction hole 103 communicates between the drive screw 196*a* and the driven screw 197*a* at the rear side of the screw chamber 195*b*.

Also, an air discharge hole 102 is opened between the first bearing unit chamber 195*a* and the screw chamber 195*b*, and communicates between the drive screw 196*a* and the driven screw 197*a* at the front side of the screw chamber 195*b*. The air supply pipe 102*a* communicating with the air supply side of the fuel cell FC is connected to the air discharge hole 102.

Further, as shown in FIG. 4, the housing 195 has an air introduction hole 105 formed therethrough and is also formed with a liquefaction chamber 104*a* communicating with the air introduction hole 105. The air introduction hole 105 is connected to an air discharge pipe 102*b* communicating with the gas discharge side of the fuel cell FC. A cylinder member 104*b* having an outer peripheral surface facing the air introduction hole 105 is arranged in the liquefaction chamber 104*a*. The interior of the cylinder member 104*b* has an air discharge hole 106 communicating with the atmosphere. Also, a water supply hole 107 communicating between the bottom portion of the liquefaction chamber 104*a* and the closed pressured supply chamber 195*d* of the air supply mechanism GS is formed through the housing 195. In this way, the liquefaction chamber 104 constituting a water supply mechanism WS is configured, and the air supply mechanism GS is integrated with the liquefaction unit 104.

In the air supply system for a fuel cell configured as described above, once the drive shaft 196 is driven by the motor M, the drive screw 196*a* and the driven screw 197*a* rotate. As a result, the air constituting an oxygen-containing gas in the atmosphere is introduced into the pressured supply chamber 195*d* from the air suction hole 103 and sent to the air discharge hole 102 under pressure. The air sent under pressure is supplied to the fuel cell FC through the air supply pipe 102*a*. In the fuel cell FC, the oxygen in the air is consumed and the air remaining as an exhaust gas is supplied through the air discharge pipe 102*b* to the liquefaction unit 104.

In the liquefaction unit 104, the air discharged from the fuel cell FC generates a turbulent flow by centrifugal force and by colliding the inner peripheral surface of the liquefaction chamber 104*a* with the turbulent flow, the water vapor contained therein is liquefied into water. Water is stored in the liquefaction chamber 104*a* in this way, and supplied to the closed pressured supply chamber 195*d* through the water supply hole 107. The remaining air is released into the atmosphere through the air discharge hole 106.

As described above, the air supply system of this type for a fuel cell can exhibit effects similar to those of the first embodiment.

Embodiment 4

Figure 5:
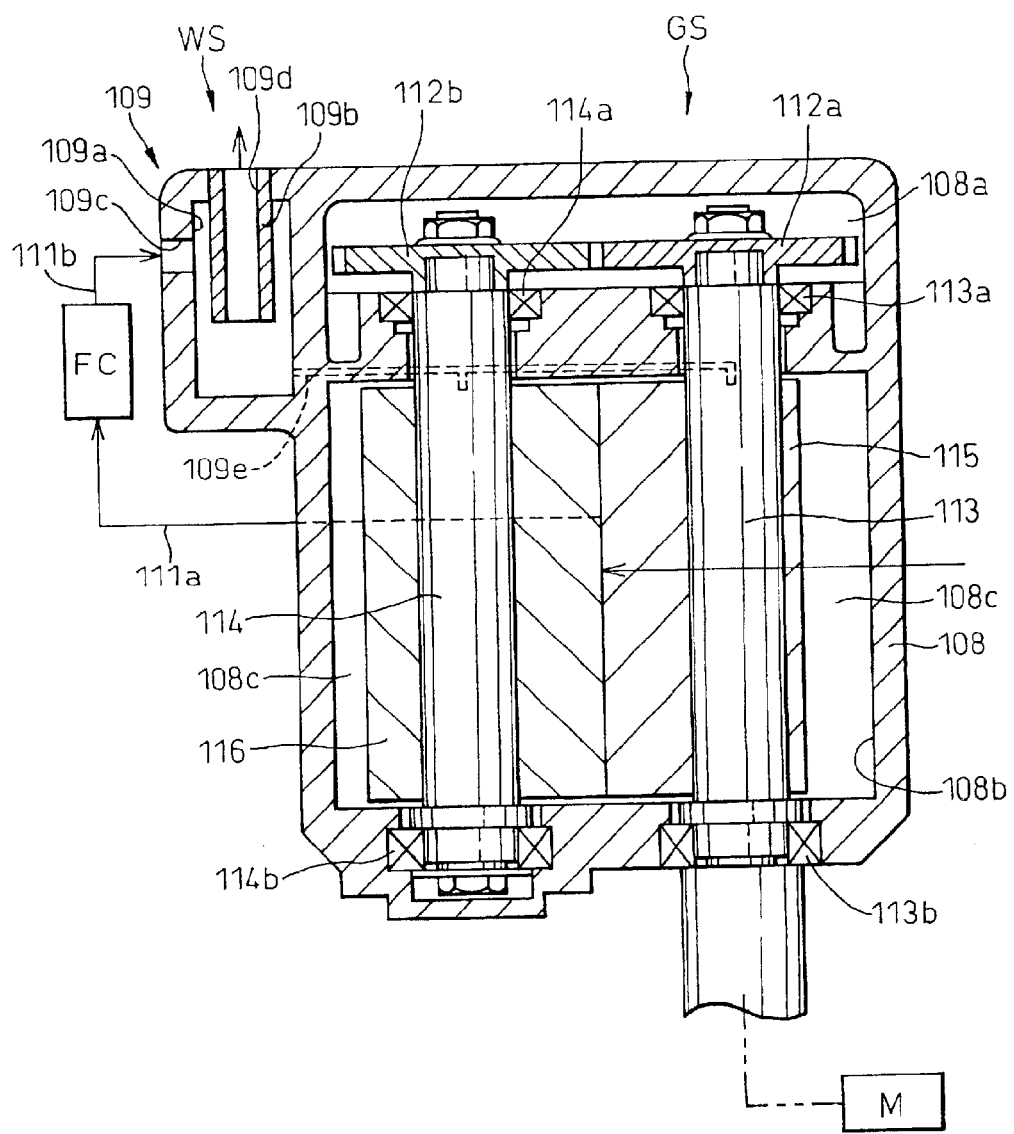
FIG. 5 is a longitudinal sectional view of an air supply system for a fuel cell according to a fourth embodiment of the invention.
Figure 6:
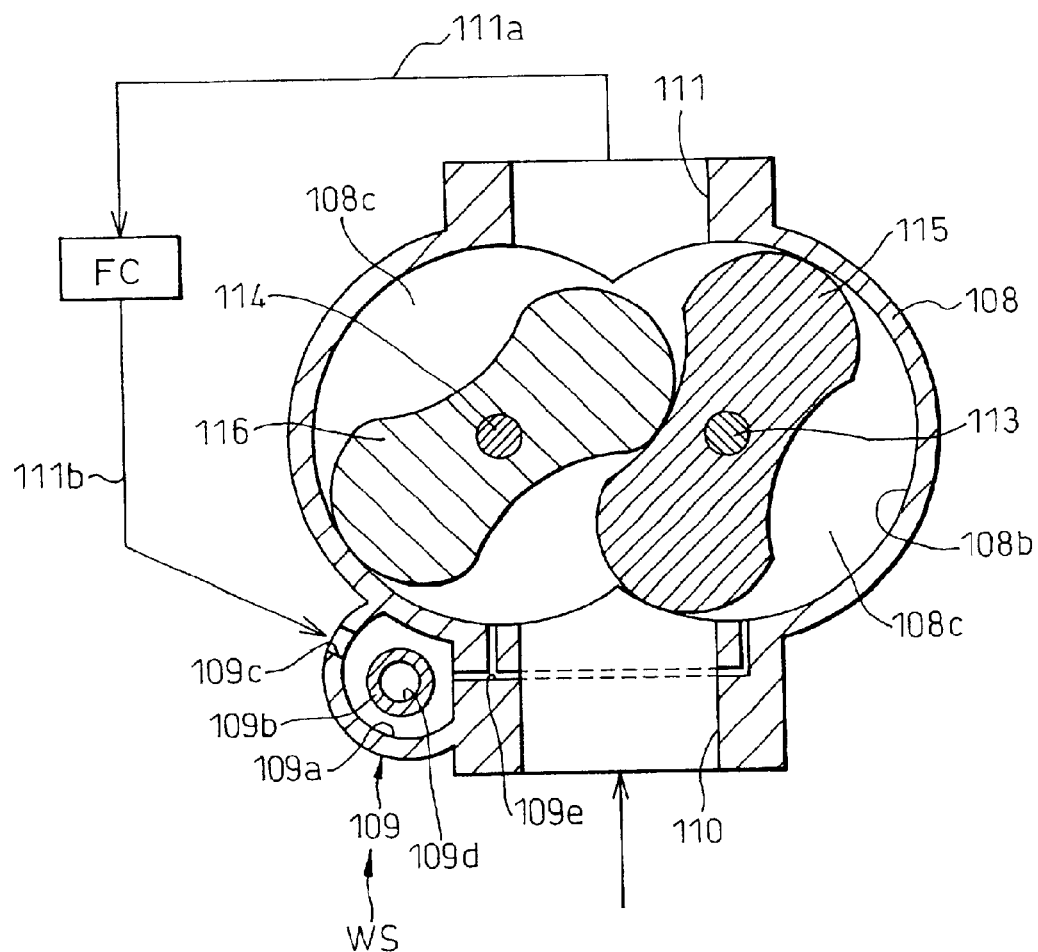
FIG. 6 is a cross sectional view of an air supply system for a fuel cell according to the fourth embodiment of the invention.

The air supply system for a fuel cell according to a fourth embodiment includes a gear chamber 108*a* and a rotor chamber 108*b* in the housing 108 as shown in FIG. 5. A gear 112*a* and a gear 112*b* in mesh with each other are arranged in the gear chamber 108*a*. A drive shaft 113 passing through the rotor chamber 108*b* is fixed to the gear 112*a*, and is rotatably supported through the bearing units 113*a*, 113*b*. The drive shaft 113 passes through the bottom surface of the housing 108 and is connected to the motor M constituting a drive source through a power transmission mechanism not shown. A driven shaft 114 parallel to the drive shaft 113 passes through the rotor chamber 108*b*, is fixed to the gear 112*b* and is rotatably supported through the bearing units 114*a*, 114*b*. Rotors 115, 116, having a cocoon-shaped section are fixed on the drive shaft 113 and the driven shaft 114, 90 degrees apart in phase from each other, as shown in FIG. 6. In this way, a pressurized supply chamber 108*c* constituting a closed air supply chamber is formed of the gear chamber 108*a* of the housing 108 and the rotors 115, 116. These component parts make up a root-type air supply mechanism GS.

An air suction hole 110 open to the atmosphere is formed on one side of the housing 108, and an air discharge hole 111 is formed on the other side of the housing 108 far from the air suction hole 110 with the rotors 115, 116 therebetween. The air discharge hole 111 is connected to an air supply pipe 111*a* communicating with the oxygen-containing gas supply side of the fuel cell FC.

As shown in FIG. 5, an air introduction hole 109*c* is formed through the housing 108, which also has formed therein a liquefaction chamber 109*a* communicating with the air introduction hole 109*c*. The air introduction hole 109*c* is connected to an air discharge pipe 111*b* communicating with the gas exhaust side of the fuel cell FC. A cylinder member 109*b* having an outer peripheral surface in opposed relation to the air introduction hole 109*c* is arranged in the liquefaction chamber 109*a*. The interior of the cylinder member 109*b* has an air discharge hole 109*d* communicating with the atmosphere. A water supply hole 109*e* is also formed in the housing 108 for communicating between the bottom portion of the liquefaction chamber 109*a* and the closed pressured supply chamber 108*c* of the air supply mechanism GS. In this way, the liquefaction unit 109, of a centrifugal separation type and constituting the water supply mechanism WS, is configured integrally with the air supply mechanism GS.

In the air supply system for the fuel cell configured as described above, the rotors 115, 116 are rotated when the drive shaft 113 is driven by the motor M. As a result, air, constituting an oxygen-containing gas, is introduced into the pressured supply chamber 108c from the air suction hole 110 and sent to the air discharge hole 111 under pressure. The air thus sent under pressure is supplied to the fuel cell FC through the air supply pipe 111a. In the fuel cell FC, the oxygen in the air is consumed, and the air that remains as an exhaust gas is supplied to the liquefaction unit 109 through the air discharge pipe 111b.

In the liquefaction unit 109, a turbulent flow, of the air discharged from the fuel cell FC, is generated around the cylinder member 109b by centrifugal force and it collides with the inner peripheral surface of the liquefaction chamber 109a thereby to liquefy the water vapor contained therein. This water is stored in the liquefaction chamber 109a and supplied through the water supply hole 109e to the closed pressured supply chamber 108c. The remaining air is released into the atmosphere through the air discharge hole 109d.

In this way, the air supply system for the fuel cell according to this embodiment can exhibit effects similar to the first embodiment.

Embodiment 5

Figure 7:
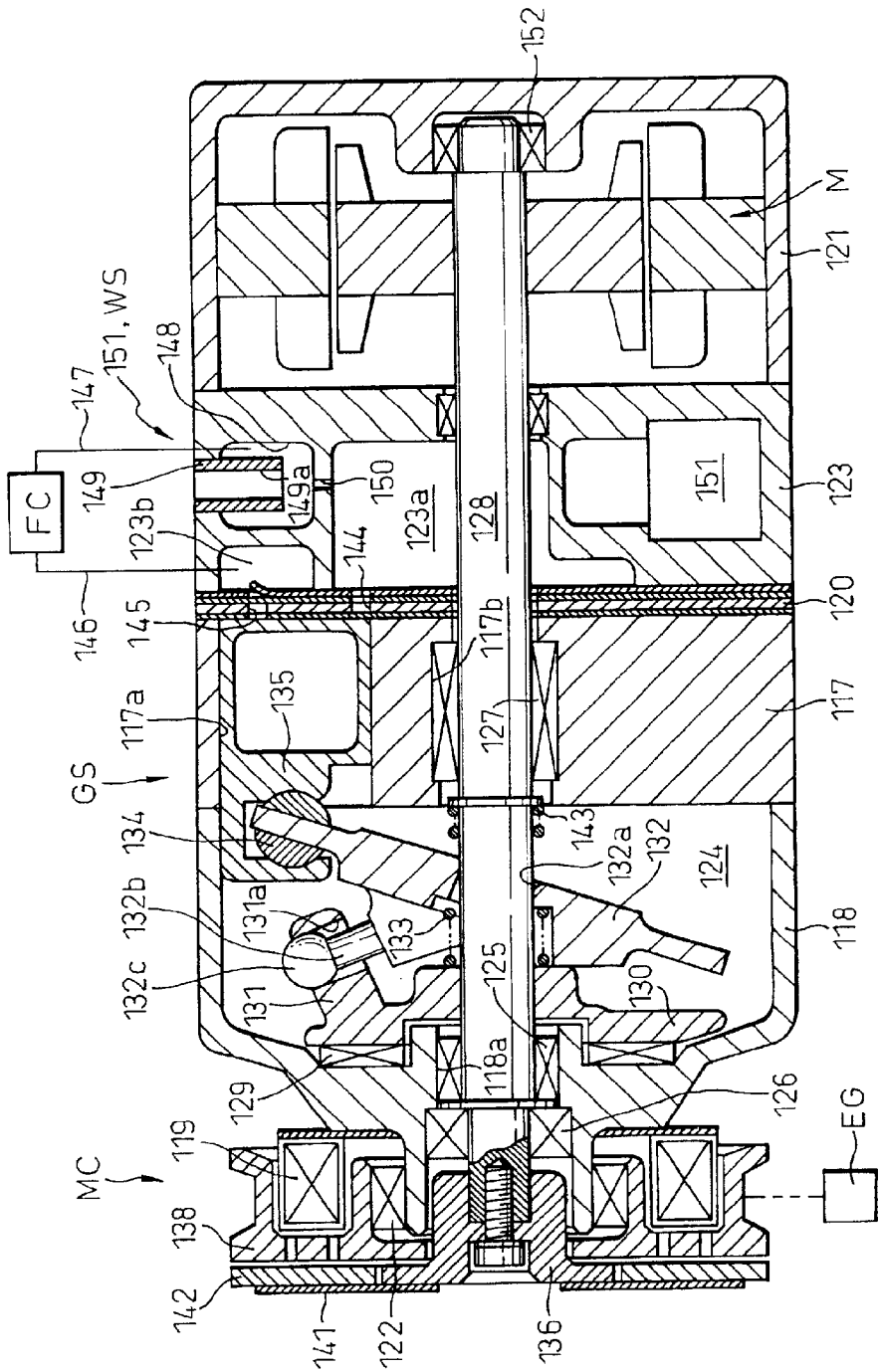
FIG. 7 is a longitudinal sectional view of an air supply system for a fuel cell according to a fifth embodiment of the invention.

In the air supply system for the fuel cell according to a fifth embodiment, as shown in FIG. 7, a cup-shaped front housing 118 is coupled to the front end of the cylinder block 117 formed with a plurality of cylinder bores 117a and an axial central holes 117b, and a rear housing 123 is coupled to the rear end of the cylinder block 117 with a valve plate 120, etc. held therebetween. A motor housing 121 is fixed on the rear end of the rear housing 123. The cylinder block 117, the front housing 118, the rear housing 123 and the motor housing 121 make up a housing assembly.

The front housing 118 is also formed with an axial hole 118a. In the crank chamber 124 formed of the front end of the cylinder block 117 and the front housing 118, a drive shaft 128 is rotatably supported through a bearing unit 125 and a shaft seal unit 126 in the axial hole 118a and also through a bearing unit 127 in the axial hole 117b of the cylinder block 117.

In the crank chamber 124, a lug plate 130 is fixed on the drive shaft 128. The bearing unit 129 is interposed between the lug plate 130 and the front housing 118. A pair of arms 131 protrude rearward from the lug plate 130, and a guide hole 131a having a cylindrical inner surface is formed through each arm 131. The drive shaft 128 is inserted through a through hole 132a of a swash plate 132, and an inclination angle-reducing spring 133 is interposed between the swash plate 132 and the lug plate 130. On the other hand, a return spring 143 is arranged, with a snap ring, on the drive shaft 128 slightly behind the swash plate 132.

A pair of guide pins 132b at the front end of the swash plate 132 protrude toward each arm 131, and a guide portion 132c having a spherical outer surface rotatable and slidable in the guide hole 131a is formed at the forward end of each guide pin 132b.

Pistons 135, supported by a corresponding pair of shoes 134, are engaged with the peripheral portion of the swash plate 132. Each piston 135 is accommodated in a corresponding cylinder bore 117a.

An suction chamber 123a and a discharge chamber 123b are formed inside the rear housing 123. The suction chamber 123a communicates with each cylinder bore 117a by way of an suction port 144 formed through the valve plate 120 and the discharge chamber 123b communicates with each cylinder bore 117a by way of the discharge port 145 formed through the valve plate 120.

The liquefaction chamber 148 is formed in the rear housing 123. The discharge chamber 123b is connected to the air supply pipe 146 communicating with the oxygen-containing gas supply side of the fuel cell FC, and the air discharge pipe 147 communicating with the liquefaction chamber 148 is connected to the gas discharge side of the fuel cell FC. A cylinder member 149 having an outer peripheral surface in opposed relation to the air discharge pipe 147 is arranged in the liquefaction chamber 148. The interior of the cylinder member 149 is formed with an air discharge hole 149a communicating with the atmosphere. A water supply hole 150 communicating between the bottom portion of the liquefaction chamber 148 and the suction chamber 123a is formed through the rear housing 123. The rear housing 123 has accommodated therein a control valve 151 for changing the stroke of the piston 135 and the inclination angle of the swash plate 132 in accordance with the differential pressure between the internal pressure of the crank chamber 124 and the suction pressure in the suction chamber 123a thereby to control the compression capacity. In this way, the liquefaction unit 151 of a centrifugal separation type constituting the water supply mechanism WS is configured, and the air supply mechanism GS is integrated with the liquefaction unit 151.

A motor M including the drive shaft 128 supported by the bearing unit 152 is configured in the motor housing 121. In this way, the air supply mechanism GS and the liquefaction unit 151 are integrated with each other and also with the motor M.

Further, an electromagnetic clutch MC is arranged on the drive shaft 128 protruded forward from the front housing 118. Specifically, a pulley 138 is rotatably mounted on the front housing 118 through the bearing unit 122, and an excitation coil 119 is fixed in the pulley 138. A belt, not shown, connected with the engine EG constituting a drive source is wound on the pulley 138. Also, a hub 136 is fixed on the drive shaft 128, and an armature 142 facing the pulley 138 is mounted, movably back and forth on the hub 136 through the spring plate 141.

In the air supply system for the fuel cell configured as described above, when the drive shaft 128 is driven by the engine EG or the motor M, the swash plate 132 rotates synchronously, so that the piston 135 reciprocates in the cylinder bore 117a through shoes 134. As a result, a compression chamber is formed as an air supply chamber between the cylinder bore 117a and the head of the piston 135. When the compression chamber is in a suction stage, the air constituting the oxygen-containing gas is introduced from the suction chamber 123a, while, when the compression chamber is in a compression stage, the air constituting the high-pressure oxygen-containing gas is discharged from the compression chamber to the discharge chamber 123b. The air discharged to the discharge chamber 123b is supplied to the fuel cell FC through the air supply pipe 146. In the fuel cell FC, the oxygen in the air is consumed, and the air remaining as an exhaust gas is supplied from the air discharge pipe 147 to the liquefaction unit 151.

In the liquefaction unit 151, a turbulent flow of the air, discharged from the fuel cell FC, is generated around the cylinder member 149 by centrifugal force and it collides with the inner peripheral surface of the liquefaction chamber 148 thereby to liquefy the water vapor contained in the air. The remaining air is discharged into the atmosphere by way of the air discharge hole 149a. In this way, water is stored in the liquefaction chamber 148 and supplied through the water supply hole 150 to the suction chamber 123a.

In this way, the air supply system for the fuel cell according to this embodiment can exhibit functions and effects similar to those of the first embodiment.

The air supply system for the fuel cell according to this embodiment also employs the engine EG in addition to the motor M as a drive source, and has an electromagnetic clutch MC arranged on the drive shaft 128. In the case where the air supply system is mounted in a hybrid car or the like, therefore, the mode for driving the air supply mechanism GS with the motor M and the mode for driving the air supply mechanism GS with the engine EG can be easily switched.

Figure 8:
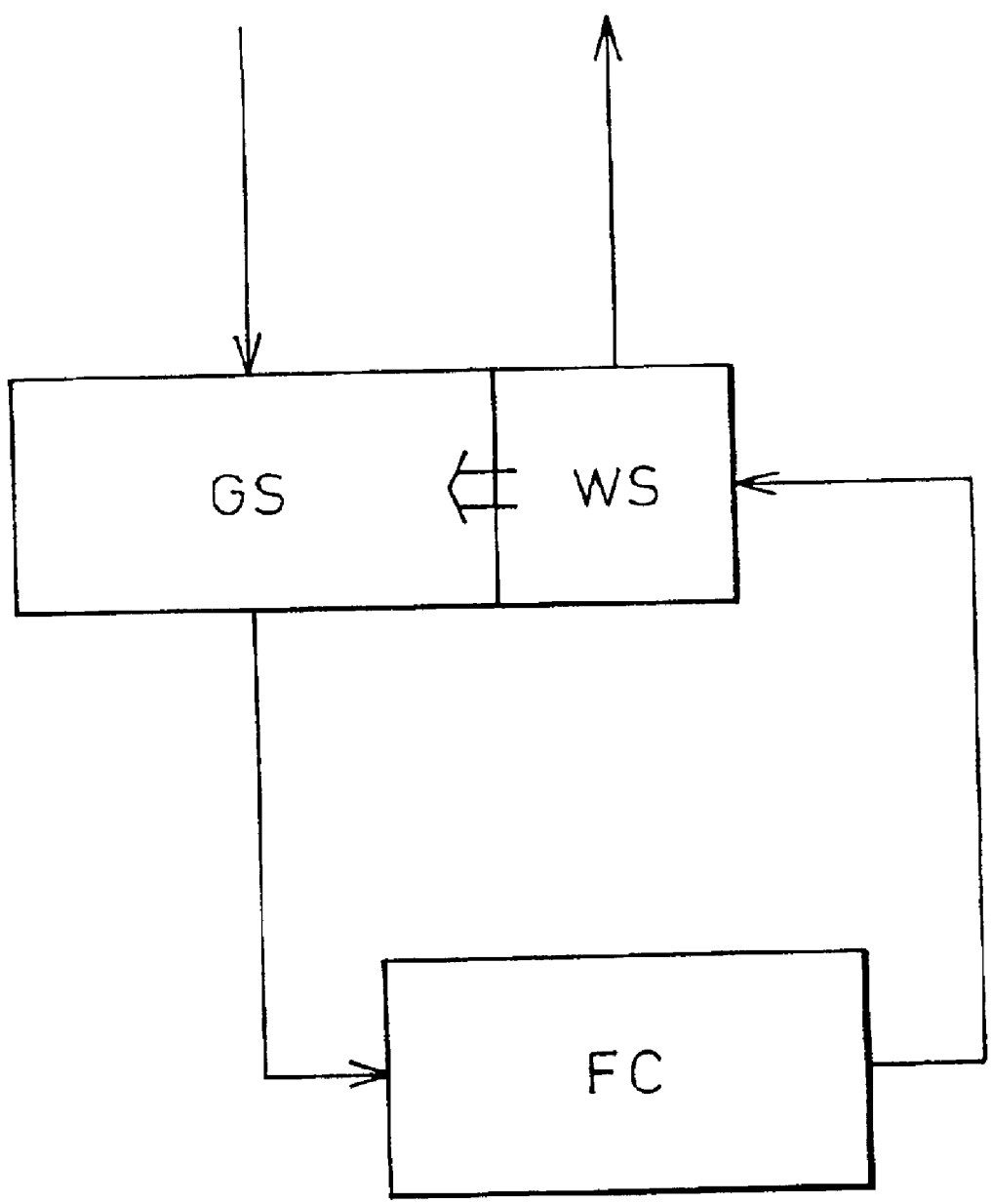
FIG. 8 is a diagram schematically showing the structure of an air supply system for a fuel cell according to the first to fifth embodiments of the invention.

As described above, according to the first to fifth embodiments of the invention, as shown in FIG. 8, the oxygen-containing gas is supplied from the air supply mechanism GS to the fuel cell FC, and the exhaust gas, after consumption of the oxygen therein in the fuel cell FC, is supplied to the water supply mechanism WS. The air supply mechanism GS and the water supply mechanism WS are integrated with each other.

Embodiment 6

Figure 9:
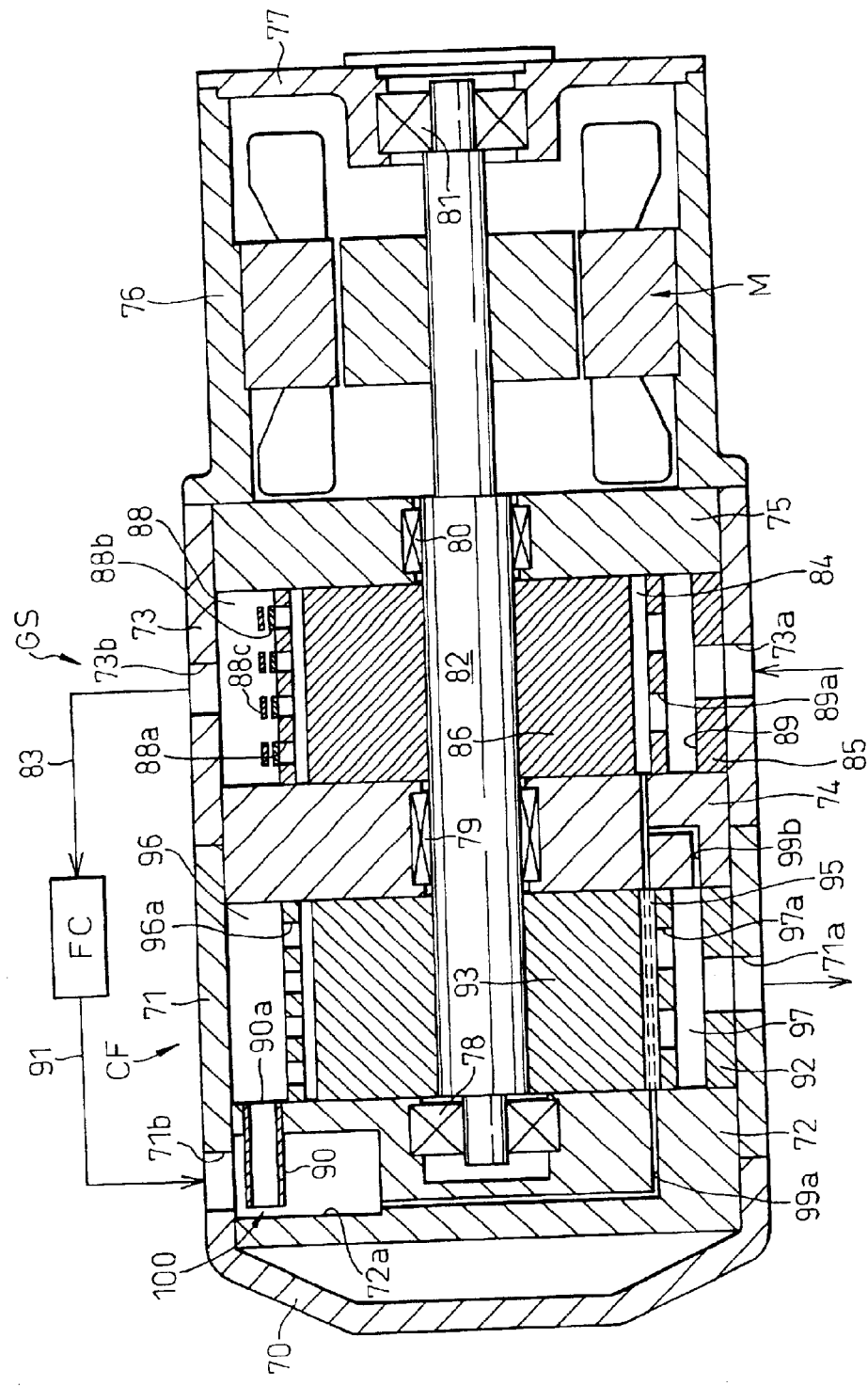
FIG. 9 is a longitudinal sectional view of an air supply system for a fuel cell according to a sixth embodiment of the invention.

In the air supply system for the fuel cell according to a sixth embodiment, as shown in FIG. 9, a cylindrical first center housing 71 is coupled to the rear end of a cup-shaped front housing 70, and a radially extending front plate 72 is fixedly interposed between the front housing 70 and the first center housing 71. Also, a cylindrical second center housing 73 is coupled to the rear end of the first center housing 71, and a radially extending first center plate 74 is fixedly interposed between the first center housing 71 and the second center housing 73. Further, a radially extending second center plate 75 is fixed at the rear end of the second center housing 73, and a cylindrical motor housing 76 is coupled to the rear end of the second center plate 75. The rear end of the motor housing 76 is closed by a rear plate 77. A housing assembly is made up of the front housing 70, the first and second center housings 71, 73, the front plate 72, the first and second center plates 74, 75, the motor housing 76 and the rear plate 77. The drive shaft 82 is rotatably supported by the bearing units 78 to 81 on the front plate 72, the first and second center plates 74, 75 and the rear plate 77.

An air suction hole 73a open to the atmosphere and an air discharge hole 73b are formed in the peripheral surface of the second center housing 73. The air discharge hole 73b is connected to an air supply pipe 83 communicating with the oxygen-containing gas supply side of the fuel cell FC.

Figure 10:
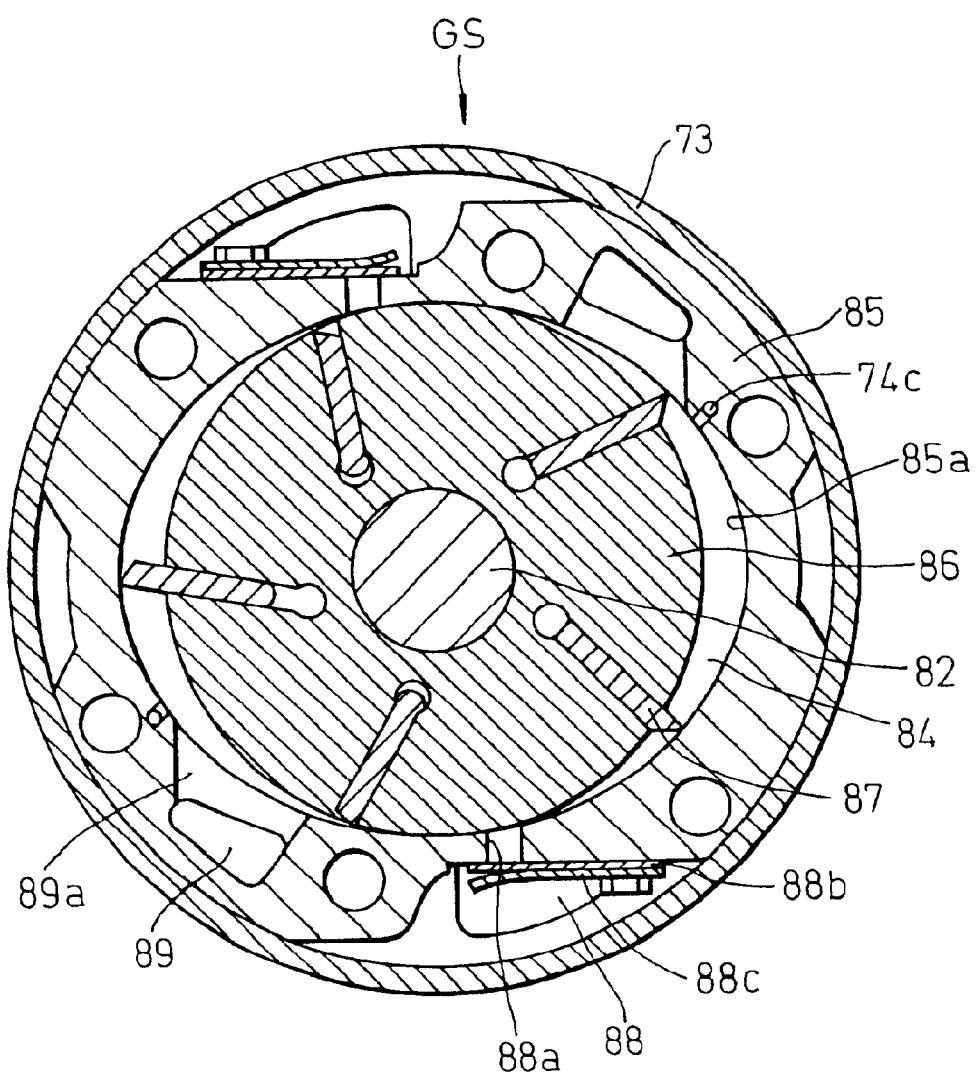
FIG. 10 is a cross sectional view of an air supply system for a fuel cell according to a sixth embodiment of the invention.

A first cylinder block 85 for defining an elliptical rotor chamber 85a at the central portion thereof is accommodated in the second center housing 73, as shown in FIG. 10. A first rotor 86 having a circular section fixed on the drive shaft 82 is arranged rotatably in the rotor chamber 85a, and a plurality of first vanes 87 are radially arranged in a manner adapted to protrude from the outer peripheral surface of the first rotor 86. In this way, a compression chamber 84 constituting an air supply chamber surrounded by the first and second center plates 74, 75, the first cylinder block 85, the first rotor 86 and a pair of the first vanes 87 is formed in the rotor chamber 85a.

As shown in FIG. 9, an air suction chamber 89 communicating with the air suction hole 73a is formed in the first cylinder block 85. The air suction chamber 89 communicates with the compression chamber 84 by way of the suction port 89a. In similar fashion, an air discharge chamber 88 communicating with the air discharge hole 73b is formed in the first cylinder block 85, and communicates also with the compression chamber 84 by way of the discharge port 88a. A discharge reed valve 88b for closing the discharge port 88a is arranged in the air discharge chamber 88, and a retainer 88c is arranged on the outside of the discharge reed valve 88b. Thus, a vane-type air supply mechanism GS is configured.

Further, as shown in FIG. 9, a primary air introduction hole 71b is formed in the peripheral surface of the first center housing 71. The primary air introduction hole 71b is connected with an air discharge pipe 91 communicating with the gas discharge side of the fuel cell FC. The front plate 72 is formed with a liquefaction chamber 72a communicating with the primary air introduction hole 71b. A cylinder member 90 having an outer peripheral surface in opposed relation to the primary air introduction hole 71b is arranged in the liquefaction chamber 72a. The interior of the cylinder member 90 makes up a primary air discharge hole 90a. In this way, a liquefaction unit 100 of a centrifugal separation type is configured.

Figure 11:
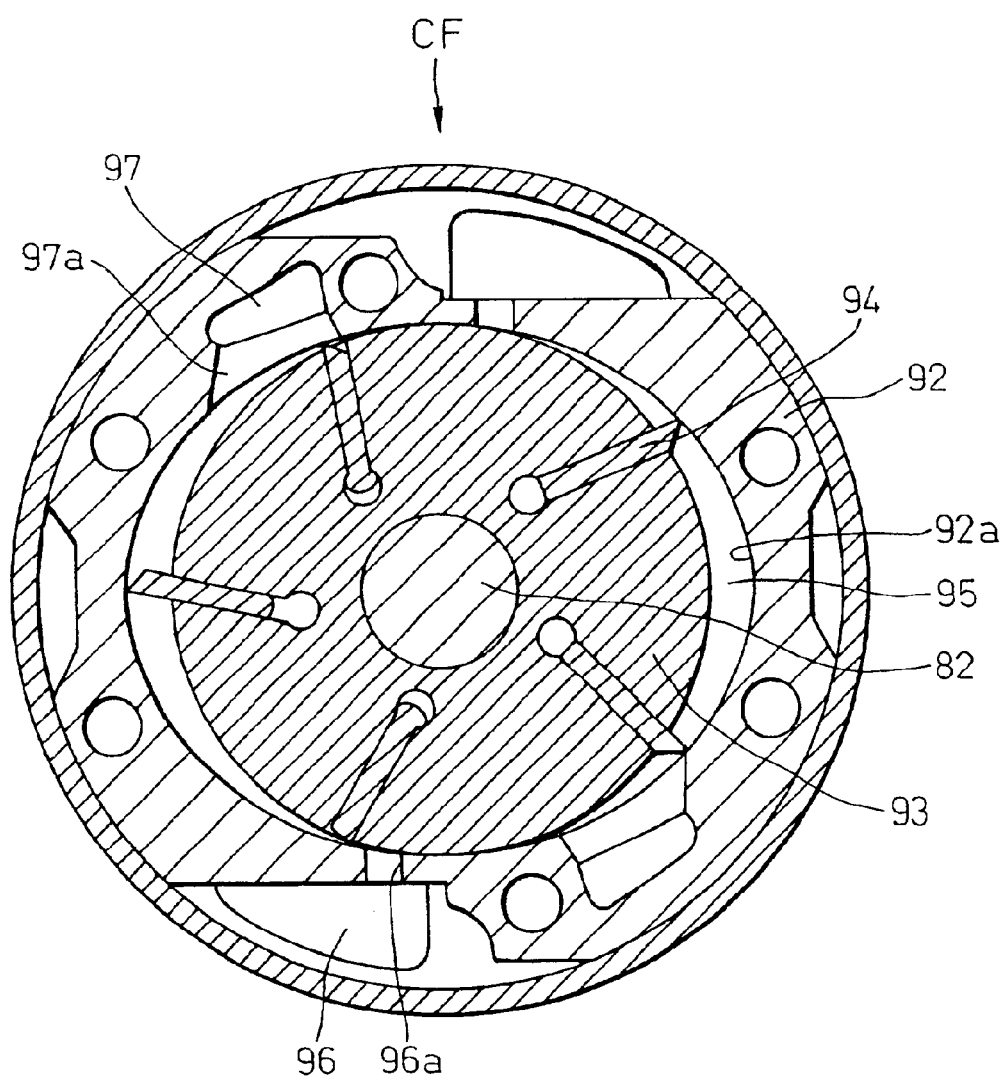
FIG. 11 is a cross sectional view of an air supply system for a fuel cell according to the sixth embodiment of the invention.

Also, the first center housing 71, as shown in FIG. 11, has accommodated therein a second cylinder block 92 for defining an elliptical rotor chamber 92a at the central portion thereof. A second rotor 93 having an elliptical section fixed on the drive shaft 82 is rotatably arranged also in the rotor chamber 92a. A plurality of second vanes 94 are arranged in a manner adapted to protrude radially from the outer peripheral surface of the second rotor 93. Thus, in the rotor chamber 92a, a regeneration chamber 95 is defined by the front plate 72, the first center plate 74, the second cylinder block 92, the second rotor 93 and a pair of the second vanes 94.

As shown in FIG. 9, a secondary air discharge hole 71a open to the atmosphere is formed in the peripheral surface of the first center housing 71. An air discharge chamber 97 communicating with the secondary air discharge hole 71a is formed in the second cylinder block 92, and communicates with the regeneration chamber 95 through the discharge port 97a. In similar fashion, an air supply chamber 96 communicating with the primary air discharge hole 90a is formed in the second cylinder block 92, and communicates with the regeneration chamber 95 by way of the supply port 96a. In this way, a vane-type regeneration mechanism CF is configured.

A first water supply hole 99a communicating with the closed compression chamber 84 of the air supply mechanism Gs is formed in the bottom portion of the liquefaction chamber 72a through the front plate 72, the second cylinder block 92 and the first center plate 74. In a similar fashion, a second water supply hole 99b communicating with the closed compression chamber 84 of the air supply mechanism GS through the first water supply hole 99a is formed in the bottom portion of the air discharge chamber 97 through the first center plate 74. In this way, the liquefaction unit 100 of centrifugal separation type is configured. The regeneration mechanism CF and the liquefaction unit 100 make up a water supply mechanism WS.

Also, as shown in FIG. 9, a motor M constituting a drive source including the drive shaft 82 is configured in the space surrounded by the second center plate 75, the motor housing 76 and the rear plate 77.

In this way, the air supply mechanism GS, the regeneration mechanism CF and the liquefaction unit 100 are integrated with each other and also with the motor M.

In the air supply system for the fuel cell configured as described above, when the drive shaft 82 is driven by the motor M, the first rotor 86 and the second rotor 93 rotate. As a result, the compression chamber 84 of the air supply mechanism GS gradually decreases in volume, so that the air in the atmosphere is introduced into the compression chamber 84 through the air suction chamber 89 from the air suction hole 73a. After being compressed to high pressure in the compression chamber 84, the air is supplied to the fuel cell FC from the air discharge chamber 88 through the air discharge hole 73b and the air supply pipe 83. In the fuel cell FC, the oxygen in the air is consumed and the air remaining as an exhaust gas is supplied to the liquefaction unit 100 from the air discharge pipe 91 through the primary air introduction hole 71b.

In the liquefaction chamber 100, a turbulent flow of the air discharged from the fuel cell FC is generated around the cylinder member 90 by centrifugal force and collides with the inner peripheral surface of the liquefaction chamber 72a thereby to liquefy the water vapor contained in the air. In this way, water is stored in the liquefaction chamber 72a and is supplied through the first water supply hole 99a to the closed compression chamber 84. The remaining air is supplied through the primary air discharge hole 90a to the air supply chamber 96 of the regeneration mechanism CF.

The air in the air supply chamber 96 is led to the regeneration chamber 95. The air in the regeneration chamber 95 tends to expand so that the volume of the regeneration chamber 95 gradually increases and the pressure therein is reduced to the atmospheric pressure. In the process, the air temperature in the regeneration chamber 95 decreases by expansion so that the water vapor contained therein is liquefied. As a result, water is stored also in the air discharge chamber 97, and supplied to the closed compression chamber 84 together with the water in the first water supply hole 99a through the second water supply hole 99b. The remaining air is discharged into the atmosphere through the secondary air discharge hole 71a from the air discharge chamber 97. In the meantime, power is generated for driving the drive shaft 82 and it assists the power of the motor M for activating the air supply mechanism GS.

In this way, the air supply system for the fuel cell according to this embodiment exhibits an effect similar to that of the first embodiment.

In the air supply system for the fuel cell according to this embodiment, the air supply mechanism GS and the regeneration mechanism CF are configured to operate on the same drive shaft 82 including the motor M. Also, in this air supply system for the fuel cell, the first rotor 86 and the second rotor 93 have the same construction. The resulting simplified structure further reduces the production cost.

The air supply mechanism GS and the regeneration mechanism CF of this air supply system for the fuel cell are of a vane type, and, therefore, are very quiet, though somewhat inferior to the air supply system for the fuel cell according to the first embodiment.

Embodiment 7

Figure 12:
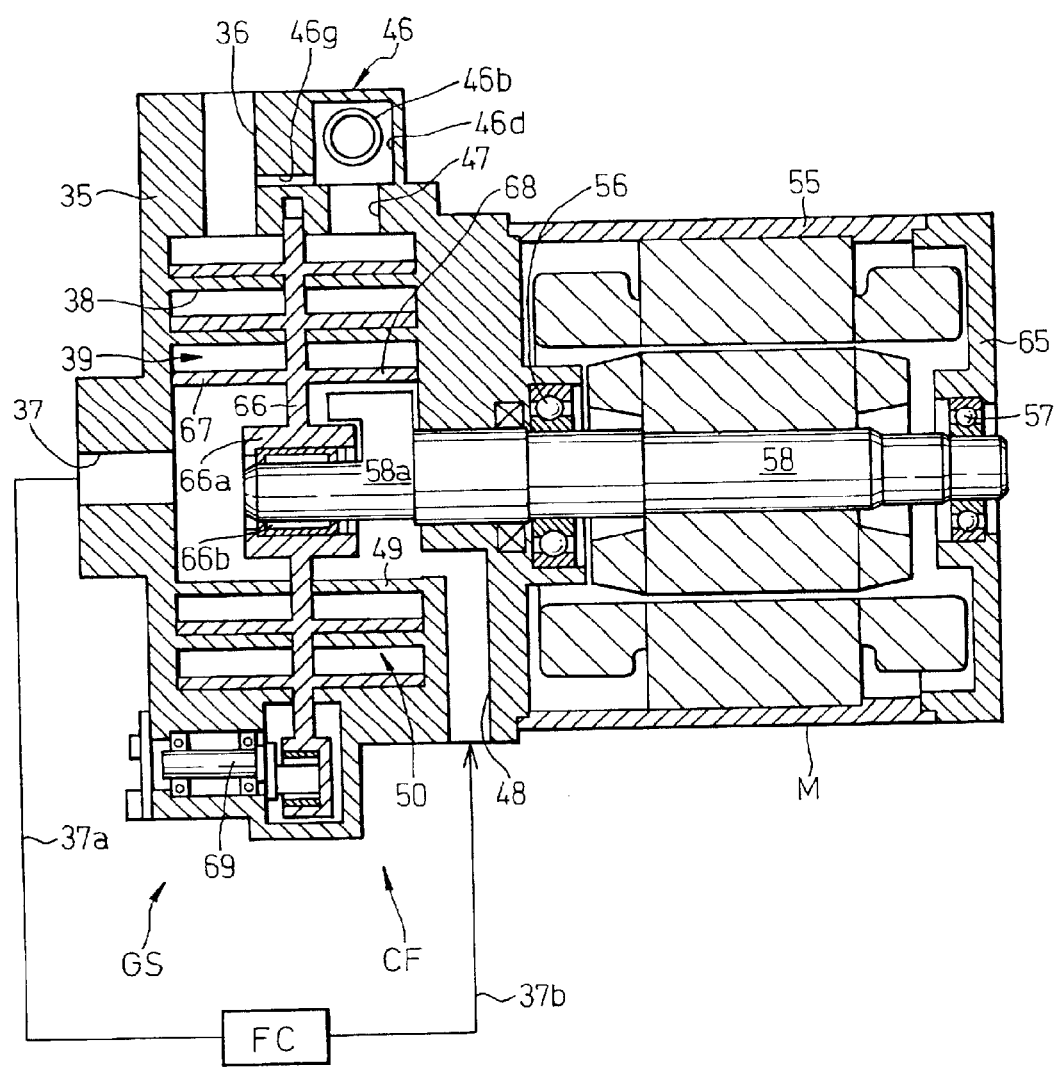
FIG. 12 is a longitudinal sectional view of an air supply system for a fuel cell according to a seventh embodiment of the invention.

In the air supply system for the fuel cell according to a seventh embodiment, as shown in FIG. 12, the motor housing 55 is coupled to the front housing 35, and the rear housing 65 is coupled to the motor housing 55. These housings make up a housing assembly.

An air suction hole 36 open to the atmosphere is formed in the radial side of the front housing 35, and an air discharge hole 37 is formed at the axial front end of the central portion of the front housing 35. The air discharge hole 37 is connected to the air supply pipe 37a communicating with the oxygen-containing gas supply side of the fuel cell FC. Also, a first fixed spiral member 38 is protruded rearward axially in the front housing 35.

A primary air introduction hole 48 is formed in the radial side of the front housing 35. The primary air introduction hole 48 is connected to the air discharge pipe 37b communicating with the gas discharge side of the fuel cell FC. On the other hand, a second fixed spiral member 49 protrudes forward axially in the front housing 35.

Further, a circular side plate 66 is arranged in the front housing 35. A first movable spiral member 67 protrudes from the side plate 66 forward axially, while a second movable spiral member 68 protrudes from the side plate 66 rearward axially. The first movable spiral member 67 is in mesh with the first fixed spiral member 38, and the second movable spiral member 68 is in mesh with the second fixed spiral member 49. Also, a boss 66a protrudes longitudinally axially from the central portion of the side plate 66.

In the motor housing 55, the drive shaft 58 is rotatably supported on the front housing 35 and the rear housing 65 through the bearing units 56, 57. An antirotation mechanism 69 is also arranged in the front housing 35. The motor housing 55 has also configured therein a motor M including the drive shaft 58. A crank pin 58a is eccentrically protruded at the front end of the drive shaft 58. The crank pin 58a is rotatably inserted into the boss 66a of the side plate 66 through the bearing unit 66b.

Figure 13:
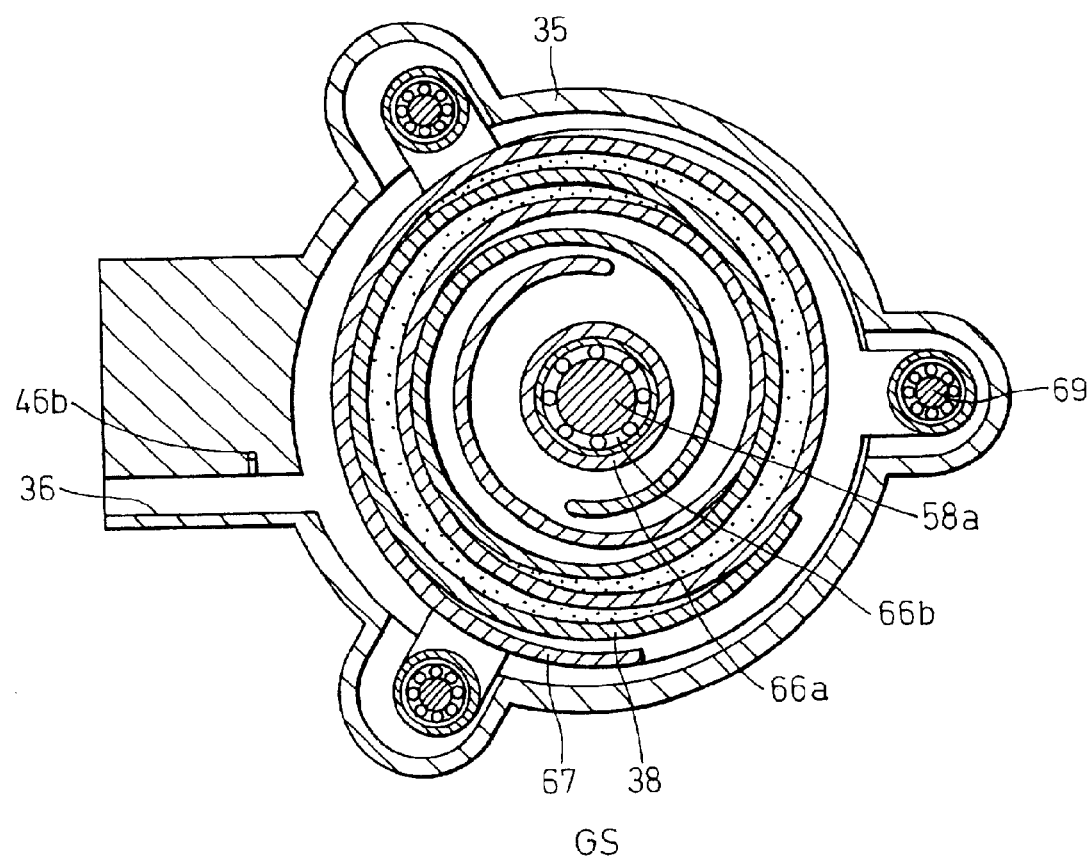
FIG. 13 is a cross sectional view of an air supply system for a fuel cell according to the seventh embodiment of the invention.

As shown in FIG. 13, the compression chamber 39 constituting a closed air supply chamber is formed of the front housing 35 and the side plate 66, thereby making up an air supply mechanism GS of scroll type. The air suction hole 36 communicates with the compression chamber 39 not yet closed, and the air discharge hole 37 communicates with the closed compression chamber 39 after the final compression operation.

Figure 14:
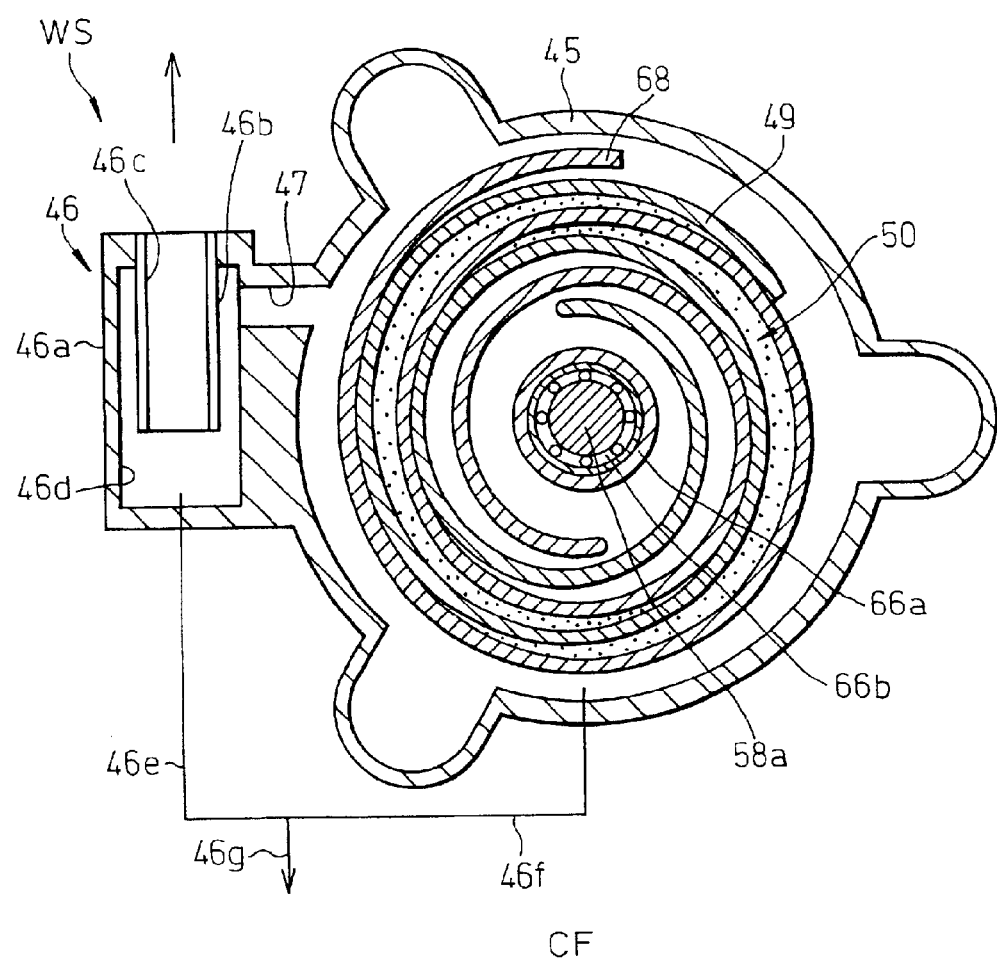
FIG. 14 is a cross sectional view of an air supply system for a fuel cell according to the seventh embodiment of the invention.

As shown in FIG. 14, on the other hand, a closed regeneration chamber 50 is formed of the front housing 35 and the side plate 66, thereby making up a regeneration mechanism CF of scroll type. The primary air introduction hole 48 communicates with the closed regeneration chamber 50 having the smallest volume.

As shown in FIGS. 12 and 14, a liquefaction unit 46 constituting a water supply mechanism WS is also arranged in the front housing 35. The liquefaction unit 46, which has the shape of a vertically extending cylinder with a bottom, includes an outer cylindrical portion 46a forming an internal liquefaction chamber 46d and an inner cylindrical portion 46b arranged on the same axis as the outer cylindrical portion 46a and protruding downward from the upper end of the outer cylindrical portion 46a. A secondary air introduction hole 47 is formed in the outer cylindrical portion 46a at a position facing the outer peripheral surface of the inner cylindrical portion 46b. The secondary air introduction hole 47 communicates with the regeneration chamber 50 which has ended an expansion and is no longer closed. The interior of the inner cylindrical portion 46b forms a secondary air discharge hole 46c communicating with the atmosphere. The regeneration mechanism CF and the liquefaction unit 46 make up a water supply mechanism WS.

A first water supply hole 46e is formed in the bottom portion of the liquefaction chamber 46d, and a second water supply hole 46f is formed in the bottom portion of the regeneration chamber 50. The first water supply hole 46e and the second water supply hole 46f communicate with the closed compression chamber 39 by way of a water supply hole 46g.

In this way, the air supply mechanism GS, the regeneration mechanism CF and the liquefaction unit 46 are integrated with each other and also with the motor M.

In the air supply system for the fuel cell configured as described above, as shown in FIG. 12, when the drive shaft 58 is driven by the motor M, the side plate 66 orbits while being prevented from rotating by the antirotation mechanism 69. As a result, as shown in FIG. 13, the compression chamber 39 of the air supply mechanism GS gradually decreases in volume, so that the air in the atmosphere is introduced into the compression chamber 39 from the air suction hole 36. The air, after being compressed to a high pressure in the compression chamber 39, is supplied to the fuel cell FC through the air supply pipe 37a from the air discharge hole 37, as shown in FIG. 12. In the fuel cell FC, the oxygen in the air is consumed, and the air remaining as an exhaust gas is supplied to the regeneration chamber 50 of the regeneration mechanism CF through the primary air introduction hole 48 from the air discharge pipe 37b.

The air in the regeneration chamber 50 tends to expand and the volume of the regeneration chamber 50 gradually increases until the pressure therein is reduced to the atmospheric pressure. In the process, the air temperature in the regeneration chamber 50 is reduced by expansion, and the water vapor contained in the air is liquefied. As a result, water is also stored on the bottom portion of the regeneration chamber 50, and supplied to the closed compression chamber 39 through the second water supply hole 46f and the water supply hole 46g. The remaining air is supplied to the liquefaction unit 46 through the primary air discharge hole 47. In the process, power for driving the drive shaft 58 is generated and assists the motor M for activating the air supply mechanism GS.

In the liquefaction unit 46, a turbulent flow of the remaining air is generated around the inner cylindrical portion 46b by centrifugal force and collides with the inner peripheral surface of the liquefaction chamber 46d to liquefy the water vapor contained in the air. In this way, water is stored in the liquefaction chamber 46d and supplied to the closed compression chamber 39 through the first water supply hole 46e and the water supply hole 46g.

As described above, the air supply system for the fuel cell according to this embodiment exhibits similar effects to those of the first and sixth embodiments.

In this air supply system for the fuel cell, the air supply mechanism GS and the regeneration mechanism CF share the side plate 66, and therefore the total axial length including the motor M can be shortened. Also, a superior mountability on an automotive vehicle is exhibited, and an extremely simplified structure reduces the production cost.

The air supply mechanism GS and the regeneration mechanism CF of this air supply system for the fuel cell are of scroll type and therefore both quiet and low weight are realized.

According to the sixth and seventh embodiments of the present invention, as shown in FIG. 15, the oxygen-containing gas is supplied from the air supply mechanism GS to the fuel cell FC, and the exhaust gas after consumption of oxygen contained therein by the fuel cell FC is supplied to the water supply mechanism WS and the regeneration mechanism CF. The air supply mechanism GS, the water supply mechanism WS and the regeneration mechanism CF are integrated with each other.

While the invention has been described by reference to specific embodiments chosen for purposes of illustration, it should be apparent that numerous modifications could be made thereto by those skilled in the art without departing from the basic concept and scope of the invention.

What is claimed is:

1. An air supply system for a fuel cell comprising:
   a housing,
   an air supply mechanism having an air supply chamber adapted to supply an oxygen-containing gas to a fuel cell and a water supply mechanism for supplying water to said air supply mechanism to seal and cool said air supply chamber,
   wherein said water supply mechanism separates water from the exhaust gas discharged from said fuel cell and supplies said water to said air supply mechanism, said air supply mechanism being integrated with said water supply mechanism, both of said air supply mechanism and said water supply mechanism being formed in said housing, wherein said air supply mechanism communicates with said water supply mechanism through a water supply hole formed in said housing.

2. An air supply system for a fuel cell according to claim 1, wherein said air supply mechanism can change the amount of the oxygen-containing gas per unit power.

3. An air supply system for a fuel cell according to claim 1, wherein said water supply mechanism has a liquefaction unit for liquefying the water vapor contained in the exhaust gas discharged from the fuel cell to thereby produce water.

4. An air supply system for a fuel cell according to claim 3, wherein said liquefaction unit is of a centrifugal separation type and generates a turbulent flow of the exhaust gas by centrifugal force which flow collides with the inner peripheral surface of said liquefaction unit thereby to liquefy the water vapor.

5. An air supply system for a fuel cell according to claim 3, wherein said liquefaction unit is a cylinder shape, and a bottom portion of said liquefaction unit communicates with a compression chamber of said air supply mechanism through a water supply hole and said water is supplied from the bottom portion of said liquefaction to the compression chamber of said air supply mechanism by means of gravity.

6. An air supply system for a fuel cell according to claim 1, wherein said water supply mechanism can change the amount of water supplied.

7. An air supply system for a fuel cell according to claim 1, wherein said housing is formed by a plurality of housing members, and said water supply mechanism and a part of said air supply mechanism are formed in the same housing member.

8. An air supply system for a fuel cell comprising:
   a housing,
   an air supply mechanism having an air supply chamber adapted to supply an oxygen-containing gas to a fuel cell and a water supply mechanism for supplying water to said air supply mechanism to seal and cool said air supply chamber,
   wherein said water supply mechanism separates water from the exhaust gas discharged from said fuel cell and supplies said water to said air supply mechanism, said air supply mechanism being integrated with said water supply mechanism,
   wherein said water supply mechanism includes a regeneration mechanism for expanding the exhaust gas discharged from said fuel cell and assisting the power to said air supply mechanism, and said regeneration mechanism includes a regeneration chamber adapted to supply the water generated by the expansion of said exhaust gas to said air supply mechanism.

9. An air supply system for a fuel cell according to claim 8, wherein said air supply mechanism and said regeneration mechanism are configured to operate on the same drive shaft.

10. An air supply system for a fuel cell according to claim 9, wherein at least one of said air supply mechanism and said regeneration mechanism is of a scroll type.

11. An air supply system for a fuel cell according to claim 10, wherein said air supply mechanism and said regeneration mechanism are of a scroll type; said air supply mechanism includes a housing, one surface of a side plate orbited by a drive shaft and a first spiral member protruded from said one surface; and said regeneration mechanism includes said housing, the other surface of said side plate and a second spiral member protruded from said other surface.

12. An air supply system for a fuel cell according to claim 9, wherein at least one of said air supply mechanism and said regeneration mechanism is of a vane type.

13. An air supply system for a fuel cell according to claim 12, wherein said air supply mechanism and said regeneration mechanism are of a vane type; said air supply mechanism includes a housing, a first rotor rotated by a drive shaft and a first vane adapted to protrude radially from said first rotor; and said regeneration mechanism includes said housing, a second rotor rotating on the same axis as said first rotor and a second vane adapted to protrude radially from said second rotor.

14. An air supply system for a fuel cell comprising:

a housing, an air supply mechanism having an air supply chamber adapted to supply an oxygen-containing gas to a fuel cell and a water supply mechanism for supplying water to said air supply mechanism to seal and cool said air supply chamber, wherein said water supply mechanism separates water from the exhaust gas discharged from said fuel cell and supplies said water to said air supply mechanism, said air supply mechanism being integrated with said water supply mechanism, both of said air supply mechanism and said water supply mechanism being formed in said housing, wherein said water supply mechanism has a liquefaction unit for liquefying the water vapor contained in the exhaust gas discharged from the fuel cell to thereby produce water, wherein said liquefaction unit is a cylinder shape, and a bottom portion of said liquefaction unit communicates with a compression chamber of said air supply mechanism through a water supply hole and said water is supplied from the bottom portion of said liquefaction to the compression chamber of said air supply mechanism by means of gravity.

* * * * *